Sept. 12, 1967     E. REICHL     3,340,744
DRIVING DEVICE

Filed May 10, 1965     2 Sheets-Sheet 1

INVENTOR.
Erwin Reichl
BY *Spencer & Kaye*
ATTORNEYS

Sept. 12, 1967   E. REICHL   3,340,744
DRIVING DEVICE
Filed May 10, 1965   2 Sheets-Sheet 2

INVENTOR.
Erwin Reichl
BY Spencer & Kaye
ATTORNEYS

United States Patent Office 3,340,744
Patented Sept. 12, 1967

3,340,744
DRIVING DEVICE
Erwin Reichl, Regensburg, Germany, assignor to Sachsenwerk Licht- und Kraft-Aktiengesellschaft, Munich, Germany
Filed May 10, 1965, Ser. No. 454,427
Claims priority, application Germany, Dec. 19, 1964, S 94,723
8 Claims. (Cl. 74—125)

ABSTRACT OF THE DISCLOSURE

A driving mechanism for tensioning the tension storage springs of electrical power switches, including a cocking lever shaft for tensioning the springs, a plurality of one-way clutches on the cocking lever shaft, and a plurality of rotary driven eccentrics each coupled to a corresponding one-way clutch, the eccentrics being angularly spaced so that their respective one-way clutches apply driving torques to the cocking lever shaft in sequence when the eccentrics are rotated by a common rotary drive means.

---

The present invention relates to a device for driving electric switches, and more particularly to a device having a cocking lever shaft driven by a system of cammed levers to tension the storage springs of such switches.

A device for tensioning such springs via a cocking shaft has already been suggested, wherein the rotary movement of a drive motor is transferred to the cocking lever shaft via one-way clutch on the cocking lever shaft. The one-way clutch has a lever extending from its housing which is acted upon by a cam mounted on the drive shaft. A conventional mechanism is used to block the backward rotation of the cocking lever shaft, so that it rotates in steps. This device has the advantage over conventional motorized power switch drives, in which a motor is used to set the storage spring in tension via a gear train or worm drive of a higher efficiency, since the sliding friction of a gear train is replaced by rolling friction. It is therefore possible to use smaller motors, and to eliminate the gear train or worm drive, both of which are relatively bulky and expensive to manufacture.

It is therefore an object of the present invention to provide a device for tensioning the storage springs in electric power switches, which device does not employ a gear train or worm drive to provide a reduction drive.

It is a further object of the present invention to provide a drive reduction unit wherein several one-way clutches sequentially engage a shaft being driven so that one of the clutches is always engaged with said shaft.

It is a further object of the present invention to provide a device for tensioning the storage springs of electric power switches wherein a variable drive ratio is provided.

These objects as well as others are achieved according to the invention in a driving device for tensioning the springs of an electrical power switch via a cocking lever shaft, which includes a plurality of one-way clutches on the cocking lever shaft, each including a driver lever for rotating the shaft through its respective one-way clutch, and a plurality of commonly driven rotary eccentrics, one for actuating each lever to rotate the cocking lever shaft, said eccentrics being irregularly relatively displaced such that their respective one-way clutches are sequentially coupled to drive the cocking lever shaft in an uninterrupted sequence. Since one of the clutches is always coupled to the cocking lever shaft, the means above referred to for preventing backward rotation of the shaft are not required. Preferably, the eccentrics should be displaced relative to each other by the same angle.

Additional objects and advantages of the present invention will become apparent upon consideration of the following description when taken in conjunction with the accompanying drawings in which.

Figure 2:
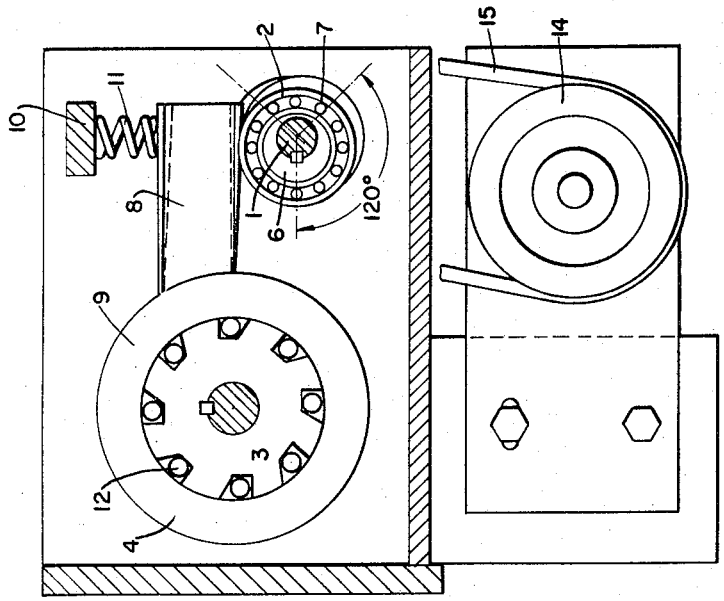
FIGURE 2 is a cross-sectional view of the device of FIGURE 1 taken along the line 2—2.
Figure 1:
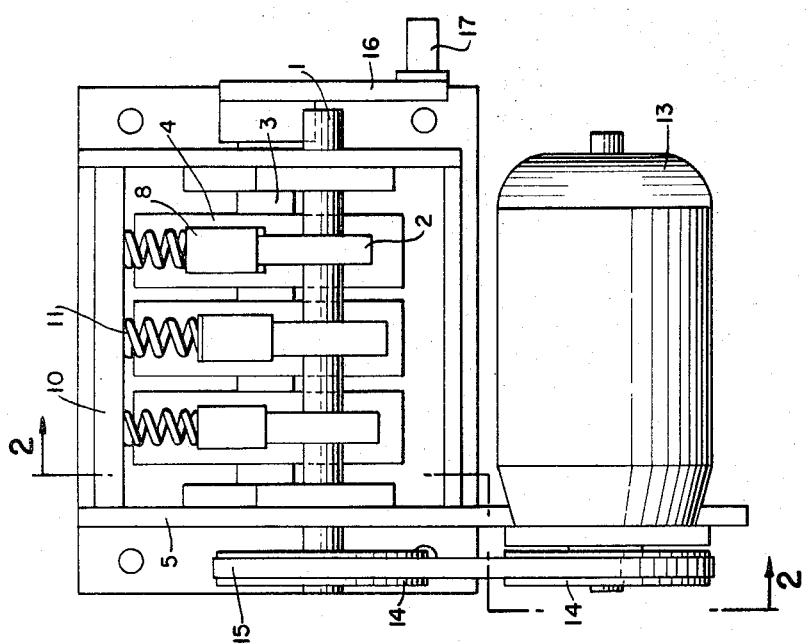
FIGURE 1 is a plan view of a driving device constructed according to the present invention.

Referring particularly to the drawings, FIGURE 1 shows a driving device in which three eccentrics 2 are mounted on a drive shaft 1 which is driven by the motor 13 via a belt 15 and pulleys 14 on the motor and drive shaft. A cocking lever shaft 3, upon which one-way clutches 4 are mounted, is supported in a frame 5 along with the drive shaft 1. As shown in FIGURE 2, each eccentric 2 includes an eccentric inner hub 6 about which balls or rollers 7 rotate, to form a ball bearing. A driving lever 8 is mounted on the outer ring 9, or housing, of each one-way clutch 4, and each driving lever abuts a respective roller bearing 2, against which it is pressed by a spring 11, which is mounted in a ledge 10 in the housing 5. The one-way clutches operate by means of clamping bodies 12. The motor 13 may be fastened to an extension of the housing 5, for instance by means of screws. A crank 16 is fastened to one end of the cocking lever shaft 3, and the tension storage spring of the switch to be driven (not shown) may be attached to a pin 17 on crank 16. Alternatively, a driving lever (not shown) may be pivoted on pin 17. A hand crank, which may be slipped onto the driving shaft 1, may be provided in case of motor failure. Such devices may also be made without motors, solely for hand operation.

The operation of the device is as follows: as the drive shaft 1 rotates through 360°, the driving levers 8 are lifted by the cams or eccentrics 2, at intervals determined by the angular displacement of each eccentric relative to the next, which in the embodiment shown is 120°. As each lever is actuated, it drives the cocking lever shaft 3 via its respective one-way clutch. The housings, or outer rings of the one-way clutches are returned to their rest positions by springs 11. Given the speed of the motor and the number of eccentrics and one-way clutches, the speed of the cocking lever shaft 3 is a function of the eccentricity of the eccentrics, and the length of the levers from the cocking lever shaft to the point of engagement with the eccentrics. The drive ratio can be changed by changing the relative diameters of pulleys 14. To minimize manufacturing costs, the device should be designed with a transmission ratio which is optimum for the conditions under which it will be used. If, however, an adjustable ratio is required, this may be provided by adding a second set of eccentrics, without otherwise changing the original design. Such an embodiment, in which the drive ratio is adjustable, is illustrated in FIGURES 3 through 5, in which the parts corresponding to those of FIGURES 1 and 2 are similarly numbered.

Figure 4:
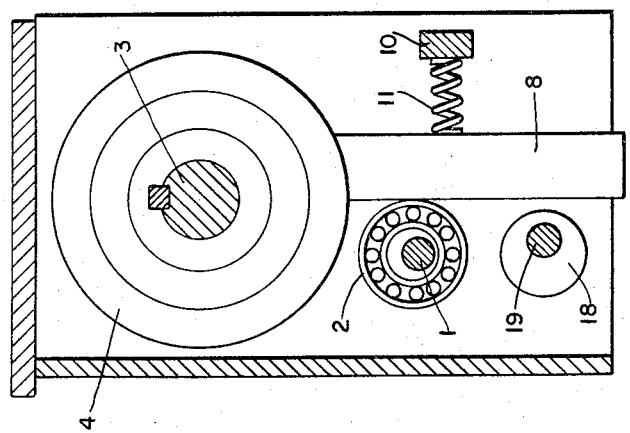
FIGURE 4 is a cross-sectional view of the embodiment of FIGURE 3 taken along the line 4—4.
Figure 5:
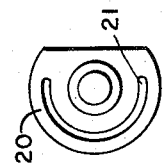
FIGURE 5 is a plan view of a locking element used in the embodiment of FIGURES 3 and 4.
Figure 3:
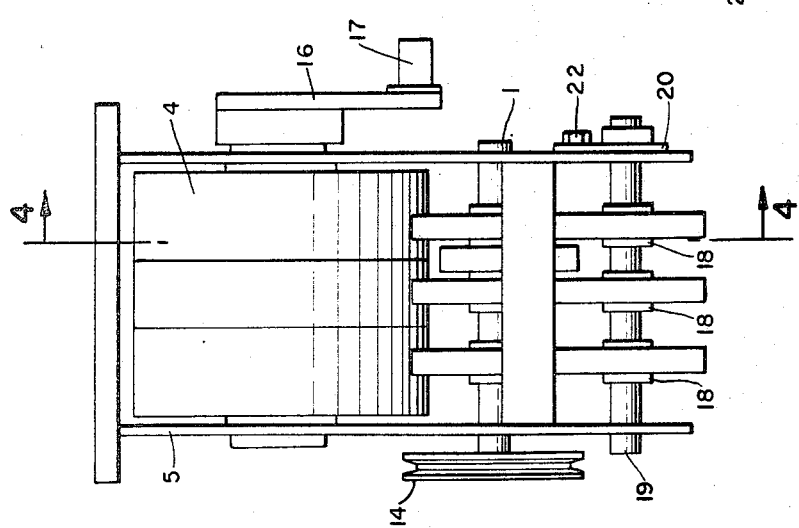
FIGURE 3 is a plan view of a different embodiment of a driving device according to the present invention.

Referring to FIGURES 3 through 5, an additional set of eccentrics 18 is provided on a shaft 19 which is rotatably mounted in the frame 5 parallel to the drive shaft 1. A longer housing 5 should be used to accommodate the extra shaft 19. A locking plate 20 is fastened to one end of the shaft, preferably exteriorly of the frame 5. An arcuate slot subtending an angle of about 180° is provided in the locking plate 20, concentrically with shaft 19. A screw 22 which is threaded into the housing 5 extends through this slot in plate 20, and, when tightened, locks the shaft 19 in a desired angular position. The eccentricity of the second set of eccentrics 18 is greater than that of the eccentrics provided on the driving shaft 1, and the driving levers 8 are lifted a distance which depends on the angle to which shaft 19 is adjusted. As the stroke of the driving levers is reduced, a larger effective drive ratio is obtained. In the embodiment shown, the angular displacement between each of the additional eccentrics 18 is zero; however, it is also possible to displace these eccentrics relative to one another. In this way, the drive ratio of the drive may be adjusted with great precision to whatever operation conditions may be encountered.

By shaping the driving cams properly, the driving strokes of the respective driving levers may be made to overlap, so that the cocking lever shaft rotates constantly and at a higher speed than would otherwise be possible, leading to a very efficient device. It is for this reason that, in the embodiment shown, three eccentrics are used, since this is an optimum solution to the problem. By using more than three eccentrics, even greater regularity of movement of the cocking lever shaft and greater efficiency are achieved, but the degree of improvement with each added lever and clutch above three is so small that the provision of such additional driving members can not ordinarily be economically justified.

As has been shown above, the clutch housing and driving levers may be formed as a single unit, simplifying manufacture of the device.

In the adjustable embodiment described above with reference to FIGURES 3 through 5, a continuously variable driving ratio is obtained by relatively simple means. Such regulation of the driving ratio is desirable, for example, if optimum performance is to be obtained in a single device both when used by hand and when driven with a motor. Such regulation is provided by means of an additional set of eccentrics, as has been described, the eccentricity of which is greater than the eccentricity of the driving cams located on the cocking lever shaft. They allow the drive ratio to be adjusted by varying the strokes of the driving levers, and may be provided such that they can be adjusted either individually or as a gang. In the latter case, a shaft 19 the angle of which is adjustable over a range of about 180° by virtue of a locking plate 20 may be used to mount the additional set of eccentrics.

It will be understood that the above description of the present invention is susceptible to various modifications, changes and adaptations, and the same are intended to be comprehended within the meaning and range of equivalents of the appended claims.

What is claimed is:

1. A driving device for tensioning the tension storage springs of electrical power switches, said device comprising, in combination:
 a cocking lever shaft for tensioning such springs;
 a plurality of one-way clutch means on said shaft, each including a driving lever means for applying a driving torque to the cocking lever shaft through the respective one-way clutch; and
 means forming a plurality of commonly driven rotary eccentrics, one for actuating each of said lever means to apply a driving torque to the cocking lever shaft, said eccentrics being relatively angularly displaced such that their respective one-way clutches apply driving torques to the cocking lever shaft in sequence when the eccentrics are rotated by a common rotary drive means, each of said eccentrics being in surface contact with the corresponding driving lever means, and means for maintaining the surface contact between said eccentrics and said driving lever means.

2. A driving device as defined in claim 1 wherein the angular displacement between any two of said eccentrics is the same.

3. A driving device as defined in claim 1, wherein each said driving lever is attached to the housing of its respective one-way clutch and extends to contact its respective eccentric in the vicinity of its free end, said device including spring means for urging each said lever toward its respective eccentric to maintain said surface contact therein between.

4. A driving device as defined in claim 3, including a second set of eccentrics, one disposed adjacent each driving lever on the same side thereof as said first-mentioned eccentrics, the eccentrics of said second set having an eccentricity greater than that of said first-mentioned eccentrics, so that the draw of the driving levers may be varied by rotating the eccentrics of said second set.

5. A driving device as defined in claim 4, wherein said second set of eccentrics is mounted on a shaft, said device including means for adjusting the angular position of said shaft over an angle of up to 180° and for locking said shaft in the position to which it is adjusted.

6. A driving device as defined in claim 5, wherein said locking and adjusting means includes a plate mounted to rotate with said shaft and having a circularly arcuate slot thereon subtending an angle of up to 180° and a screw extending through said slot into said device for locking the plate to the device.

7. A driving device as defined in claim 6, including unitary means for housing said device and provided with means for rotatably mounting the cocking lever shaft, said device including a driving shaft provided in said housing upon which said rotary eccentrics are mounted, said housing including means for mounting a motor thereon by means of screws, for driving said device.

8. A driving device as defined in claim 7, including a motor mounted on said motor mount for driving said device, pulleys provided on said motor and on said driving shaft, and a V-belt connecting said pulleys.

References Cited

FOREIGN PATENTS 551,898  11/1956  Italy.

FRED C. MATTERN, Jr., *Primary Examiner.*

W. S. RATLIFF, *Assistant Examiner.*